Sept. 5, 1944.  W. V. H. WILLIAMS  2,357,568
ELECTRIC MACHINE CONTROL
Filed Dec. 6, 1940
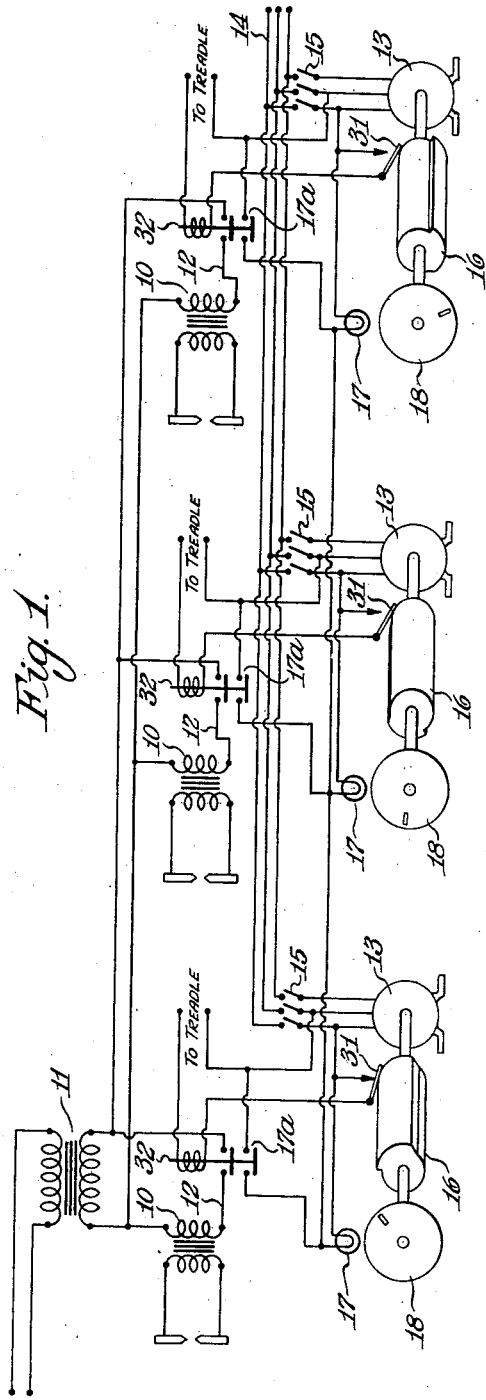
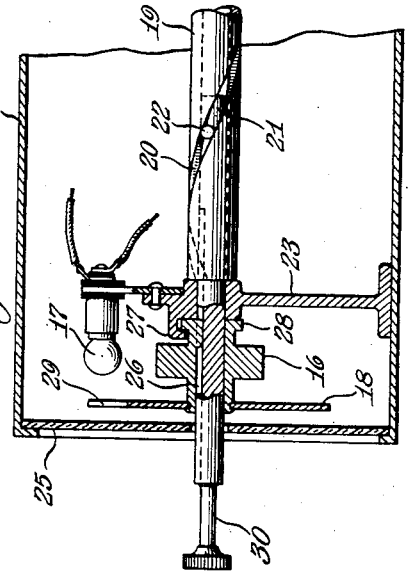
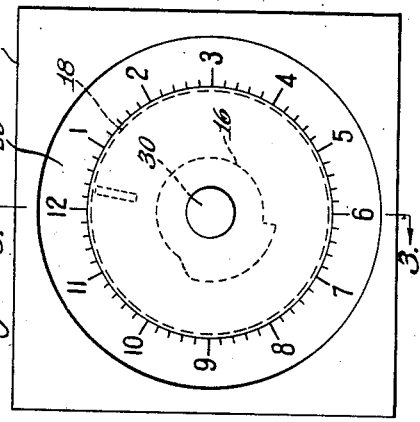
William V. H. Williams,
INVENTOR
BY Victor J. Evans & Co.
ATTORNEYS Patented Sept. 5, 1944

2,357,568

UNITED STATES PATENT OFFICE 2,357,568

ELECTRIC MACHINE CONTROL

William V. H. Williams, Norfolk, Va.

Application December 6, 1940, Serial No. 368,940

2 Claims. (Cl. 171—97)

The object of the invention is to provide means for use in connection with a plurality of electrical machines which operate on successive active and idle periods, so that the active period of each machine will be out of phase with the active period of every other machine, thereby precluding excessive line loads that would otherwise result if the active periods of the machines were at the same time or nearly so; to provide a means for the purpose indicated whereby, when the actuating member of each machine is placed in operation, that machine may be instantly adjusted by the operator to have its active period occur at a time when the remaining machines are inactive; and generally to provide means for the purpose indicated which is of comparatively simple form and therefore susceptible of cheap manufacture and installation at low cost without any material modification of the conventional apparatus on which it is used.

With this object in view, the invention consists in a construction and combination of parts of which a preferred embodiment is illustrated in the accompanying drawing but to which the invention is not to be restricted. Practical application may dictate certain changes or alterations and the right is claimed to make any which fall within the spirit of the invention.

Figure 1 is a diagrammatic view illustrating the application of the invention.

Figure 2 is an elevational view of the indicator disk and housing.

Figure 3 is a sectional view on the plane indicated by the line 3—3 of Figure 2.

As illustrated, the invention is shown as used in connection with a plurality of electric spot welders 10, the primaries of which are connected in parallel across the secondary of the input transformer 11 designed to step down a high line voltage to, say, 440 volts or 220 volts where it would not be a hazard in wiring to the different welders.

In the conventional practice, the welders 10 are controlled each by a treadle actuated by the operator when the machine is to be used and the treadle controls the primary of the welder in conjunction with the switch 31 and relay 32— that is, when the switch 31 is closed, depression of the treadle will put the welder into operation. The treadle and its control of the welder is conventional structure so it is not necessary of illustration in this case.

Each welder is operated by its motor 13 and the several motors, when energized, operate in synchronism. Preferably they are three phase and each is energized from the power line 14 when its switch 15 is closed.

The switch 12 of each welder, which is one of a duality of switches operated by the relay 32, is closed upon energization of the relay effected by closing the switch 31 in addition to the treadle switch, and the switch 12 is retained in its closed position by a timing cam 16 which is driven by the motor 13, and, as the motor is synchronized with the motor of the other welders, it will be seen that the welders are in operation for a specified period.

In the illustrated embodiment of the invention, the object sought is attained by adjusting the position of the cam 16 on the driving shaft of its motor, which adjustment is effected simultaneously with the adjustment of the indicator disk 18 with which each welder is provided.

The signals 17 of all of the welders are connected in parallel and are controlled by switches 17a which are likewise connected in parallel and of which there is one for each welder operated by the relay of that welder in synchronism with the switch 12, so that the closing of any switch 17a will effect illumination of all of the signals 17.

In the construction illustrated, the driving shaft of the motor 13 is coupled with the tubular shaft 19 which is provided with a spiral slot 20. Entering the tubular shaft 19 is a pilot shaft 21, this pilot shaft having a radial pin 22 disposed in the spiral slot 20, so that if the pilot shaft be moved axially, as it may be in the use of the invention, there will be a relative change of position angularly between the tubular shaft and the pilot shaft.

The pilot shaft 21 forms the journal for the tubular shaft and is rotatably mounted in a bearing standard 23, the latter being within a housing 24 which is of sufficient extent to house the tubular shaft 19.

That end of the housing 24 remote from the motor 13 is closed with a panel 25, translucent or transparent, but indited with reference characters that constitute a dial. The indicator disk 18 is directly behind the dial and is mounted in common with the cam 16, the latter being keyed to the pilot shaft as indicated at 26, so that axial movement of the pilot shaft relative to the cam is possible but relative angular movement is precluded. Axial movement of the cam is precluded by means of a hooked extension 27 on the bearing standard 23 which engages behind a flange 28 on the hub of the cam 16. The axial movement of the pilot shaft relative to the cam changes the position of the indicator disk in respect to the signal light 17.

The indicator disk 18 is opaque but is formed with a sight opening 29 and this disk is disposed directly behind the panel 25. While the center portion of the panel 25 is transparent, the outer indited area is opaque, so that when the signal light 18 is illuminated, the indicator disk will have the effect of carrying a lighted area around the dial.

Axial movement of the pilot shaft is effected by means of a headed finger stem 30 exterior to the face of the panel 25 through the center of which the pilot shaft extends.

In the operation of the invention, let it be assumed that none of the welders is in operation and that the motors 13 are disconnected from the power line. One welder is put in operation and that is done by first energizing the starting motor 13 accomplished by closing the switch 15. Each time the cam 16 operates the switch 31, that particular welder will be in condition to be actuated on depression of the foot treadle which will result in closing the switches 12 and 17a through energization of the relay 32. Closure of the switch 17a will energize all of the signal lights which will remain energized for the period that the relay 32 keeps the switches 12 and 17a closed. And the light sources will cast a light through the sight openings 29 in the indicator disks 18. Thus, on the welder operating, the light will appear to traverse the dial for a specified angular distance and this area of the dial will represent the active period of the first welder started.

Let a second welder now be put in operation by the starting of its motor 13. Its cam will operate the switch 31 but its operator, before actuating his welder, will open the main circuit and then, depressing his foot treadle, will determine the time period at which the switches 12 and 17a are closed. The timing device of the relay 32 determines the active period of operation for each welder. If that be such, say, that the sight opening 29 will traverse an angular distance of 90° for the active period of each welder, the second operator putting his welder in operation will know whether the setting of his welder is such as to have its active period overlap the active period of the welder first started, because if there is an overlap, the sight opening in the indicator disk will appear illuminated for a longer period than the 90° travel but for a less period than the 180° travel. Therefore he will adjust his pilot shaft until the light spot traverses the dial for 180°—that is, he will adjust his pilot shaft, so as to have his switch 17a begin to function at the time the switch of the previously started welder will be open, since pilot shaft adjustment will effect relative angular change of position between the cam 16 and the shaft of the driving motor.

The next operator will, in starting his welder, note the portion of the dial already indicating the active periods of the welders in operation and accordingly effect cam adjustment on his welder to have the active period of that succeed the active periods of the other welders.

The invention having been described, what is claimed as new and useful is:

1. In combination a plurality of electrical current consuming devices, a current supply, separate means associated with each device for intermittently closing a gap in a circuit from the current supply to the device, separate means for each device for periodically closing another gap in the circuit for each device, individual driving means for each of the periodic closing means, means for operating all of the driving means at the same speed, means interposed between each driving means and its periodic circuit closing means for manually adjusting the phase relation between the circuit closing means and associated driving means, whereby the circuit closing means for the different devices will close in a manner that only one will close at a given time, and individual indicating means for each adjusting means to indicate the said necessary adjustment comprising means movable with the circuit closing means and means operated by the completion of the circuit of each of the consuming devices.

2. In combination a plurality of electrical current consuming devices, a current supply, separate means associated with each device for intermittently closing a gap in a circuit from the current supply to the device, separate means for each device for periodically closing another gap in the circuit for each device, individual driving means for each of the periodic closing means, means for operating all of the driving means at the same speed, means interposed between each driving means and its periodic circuit closing means for selectively adjusting the phase relation between the circuit closing means and associated driving means, and indicating means for each adjusting means to indicate the necessary adjustment thereof.

WILLIAM V. H. WILLIAMS.